/ United States Patent /
Hall et al.

(10) Patent No.: US 10,782,757 B2
(45) Date of Patent: Sep. 22, 2020

(54) RACK LEVEL POWER CONTROL

(71) Applicant: Equinix, Inc., Redwood City, CA (US)

(72) Inventors: David James Asher Hall, London (GB); Kaladhar Voruganti, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 174 days.

(21) Appl. No.: 15/969,615

(22) Filed: May 2, 2018

(65) Prior Publication Data
US 2019/0050036 A1    Feb. 14, 2019

Related U.S. Application Data

(60) Provisional application No. 62/543,233, filed on Aug. 9, 2017.

(51) Int. Cl.
| | | |
|---|---|---|
| *G06F 1/26* | (2006.01) | |
| *G06F 1/3206* | (2019.01) | |
| *H02J 3/14* | (2006.01) | |
| *G06F 1/3234* | (2019.01) | |
| *G05B 19/042* | (2006.01) | |

(Continued)

(52) U.S. Cl.
CPC ............ *G06F 1/26* (2013.01); *G05B 19/042* (2013.01); *G06F 1/263* (2013.01); *G06F 1/3206* (2013.01); *G06F 1/3234* (2013.01); *H02J 3/14* (2013.01); *G05B 2219/2639* (2013.01);
(Continued)

(58) Field of Classification Search
CPC . G05B 19/042; G05B 2219/2639; G06F 1/26; G06F 1/263; G06F 1/3206; G06F 1/3234; H02J 13/00; H02J 2003/003; H02J 3/14; H02J 3/32
See application file for complete search history.

(56) References Cited

U.S. PATENT DOCUMENTS

| | | | |
|---|---|---|---|
| 8,224,993 B1 * | 7/2012 | Brandwine | ........... G06F 1/3203 709/244 |
| 9,948,521 B2 | 4/2018 | Doraiswamy et al. | |

(Continued)

OTHER PUBLICATIONS

Rasmussen, "Avoiding Costs from Oversizing Data Center and Network Room Infrastructure," Schneider Electric, White Paper 37, Revision 7, 2012 (Applicant points out, in accordance with MPEO 609.04(a), that the year of publication, 2012, is sufficiently earlier than the effective U.S. filing date, 2017, so that the particular month of publication is not in issue.) 10 pp.

(Continued)

*Primary Examiner* — Yuhui R Pan
(74) *Attorney, Agent, or Firm* — Shumaker & Sieffert, P.A.

(57) ABSTRACT

In some examples, a method includes acquiring status information of at least one resource of a data center, estimating, based on the status information, whether load on a power supply will exceed a threshold value at a time subsequent a time of the estimating, and in response to estimating that load on the power supply will exceed the threshold value at the time subsequent the time of the estimating, transmitting a command signal to a server rack that is coupled to the power supply to configure equipment of the server rack to operate at a reduced power supply level that is reduced from a power supply level at the time of the estimating and that is based on a service level agreement associated with the server rack.

23 Claims, 8 Drawing Sheets

(51) Int. Cl.
H02J 3/32 (2006.01)
H02J 13/00 (2006.01)
H02J 3/00 (2006.01)

(52) U.S. Cl.
CPC ............ *H02J 3/003* (2020.01); *H02J 3/32* (2013.01); *H02J 13/00* (2013.01)

(56) References Cited

U.S. PATENT DOCUMENTS

| 2010/0064151 | A1  | 3/2010 | Saeki |
|---|---|---|---|
| 2012/0204051 | A1* | 8/2012 | Murakami ............ G06F 9/5088 713/324 |
| 2015/0051749 | A1  | 2/2015 | Hancock et al. |

OTHER PUBLICATIONS

Rasmussen, "Power and Cooling Capacity Management for Data Centers," Schneider Electric, White Paper 150, Revision 3, 2012 (Applicant points out, in accordance with MPEP 609.04(a), that the year of publication, 2012, is sufficiently earlier than the effective U.S. filing date, 2017, so that the particular month of publication is not in issue.) 15 pp.

"Pay as You Grow: A Public Cloud Experience with On-Premises It Benefits," Hewlett-Packard, Nov. 2014, 8 pp.

Brow et al., "Computing at full capacity," MIT News, Aug. 2, 2015, 4 pp.

Whitney et al., "Data Center Efficiency Assessment," NRDC, Issue Paper, Aug. 2014, 35 pp.

Greenberg et al., "The Cost of a Cloud: Research Problems in Data Center Networks," ACM SIGCOMM Computer Communication Review, Jan. 2009, 6 pp.

Torell, "Best Practices for Scaling Data Center Power Capacity and Avoiding Hidden Costs," Dell Power Solutions, Sep. 2009, pp. 74-76.

Lowe et al., "Building a Modern Data Center," ActualTech Media, Jan. 14, 2016, 263 pp.

"Open Rack Standard," Open Compute Project, Version 2.0, Jan. 2017, 70 pp.

Islam et al., "A Market Approach for Handling Power Emergencies in Multi-Tenant Data Center," 2016 IEEE International Symposium on High Performance Computer Architecture (HPCA), Mar. 2016, pp. 432-443.

International Search Report and Written Opinion of International Application No. PCT/US2018/045838, dated Sep. 25, 2018, 13 pp.

International Preliminary Report on Patentability from International Application No. PCT/US2018/045838, dated Feb. 20, 2020, 8 pp.

First Examination Report from counterpart Australian Patent Application No. 2018313839, dated Jul. 1, 2020, 4 pp.

Response to Communication Pursuant to Rules 161(1) and 162 EPC dated Jan. 7, 2020, from counterpart European Application No. 18759224.1, filed Jul. 17, 2020 , 41 pp.

* cited by examiner

RACK LEVEL POWER CONTROL

This application claims the benefit of U.S. Provisional Patent Application 62/543,233, filed Aug. 9, 2017, the entire content of which is incorporated herein by reference.

TECHNICAL FIELD

This disclosure relates to data centers and, more particularly, to data center power control.

BACKGROUND

A network services exchange provider or co-location provider ("provider") may operate a communication facility, such as a data center or warehouse, in which multiple customers of the provider locate various equipment such as network, server and storage gear, and interconnect with lengths of cable to a variety of telecommunications and other network service provider(s) often with a minimum of cost and complexity. Typically, due to redundancy concerns for example, a fraction of total installed capacity is set aside as unallocated or unavailable for use under normal operational conditions.

SUMMARY

In general, this disclosure describes techniques for allocating data center power capacity among data center customers with tiered availability using data center power capacity installed for power resiliency or power available due to instant load conditions. In an example implementation, a controller is configured to interrogate a power supply system and an operational status system and determine whether the power supply system is capable of meeting the demands of each component in a data center that is configured to receive power from power from the supply system. In the event that the controller determines that the power supply system is incapable of meeting such demands, the controller may command at least one of a plurality of server racks in the date center to self-configure resources to operate at reduced (or increased) power supply levels based in part upon service level agreements that correlate with tiered availability offerings.

From the perspective of a customer, a tiered-pricing structure that flows from such an implementation may ultimately translate into less cost for contracting power and cooling, while a tailored service level agreement may be designed to best suit customer-specific power supply needs. From the perspective of a provider, more customers in general may be serviceable and ultimately drawn into contract agreements at a particular facility due to the increase in available power capacity that results from such an implementation, while resources that would otherwise remain unused or unsold, or otherwise idle, may be exploited and monetized. In practice, such benefits and advantages may be realized by any one of a method, a device and a system according to the principles of the present disclosure.

As an example, a method may include or comprise, by a controller, acquiring status information of at least one resource of a data center, estimating, based on the status information, whether load on a power supply will exceed a threshold value at a time subsequent a time of the estimating and, in response to estimating that load on the power supply will exceed the threshold value at the time subsequent the time of the estimating, transmitting a command signal to a server rack that is coupled to the power supply to configure equipment of the server rack to operate at a power supply level that is reduced from a power supply level at the time of the estimating and that is based on a service level agreement associated with the server rack.

As another example, a controller may include or comprise at least one processor coupled to a communication unit, wherein the at least one processor is configured to activate the communication unit to receive, from a system of the data center, status information of at least one resource of the data center, perform a calculation, based on the status information, to estimate load on a power supply of the data center at a time subsequent to a time of the calculation, and activate the communication unit to transmit, to each one of a plurality of server racks that is coupled to the power supply, a command signal to self-configure equipment to operate at a power supply level, at the time subsequent to the time of the calculation, that is based on the calculation and a service level agreement for each one of the plurality of server racks.

As another example, a system may include or comprise a plurality of server racks in a data center each coupled to a power supply and configured according to a same technical specification, and a controller configured to acquire status information of at least one resource of the data center, perform a calculation, based on the status information, to determine whether load on the power supply will exceed a threshold value at a time subsequent a time of the calculation, and transmit, based on a result of the calculation, a command signal to each one of the plurality of server racks to self-configure equipment to operate at a power supply level that is different from a power supply level at the time of the calculation and that is based on a service level agreement for each one of the plurality of server rack.

The details of one or more examples are set forth in the accompanying drawings and the description below. Other features, objects, and advantages will be apparent from the description and drawings, and from the claims.

DETAILED DESCRIPTION

Figure 1:
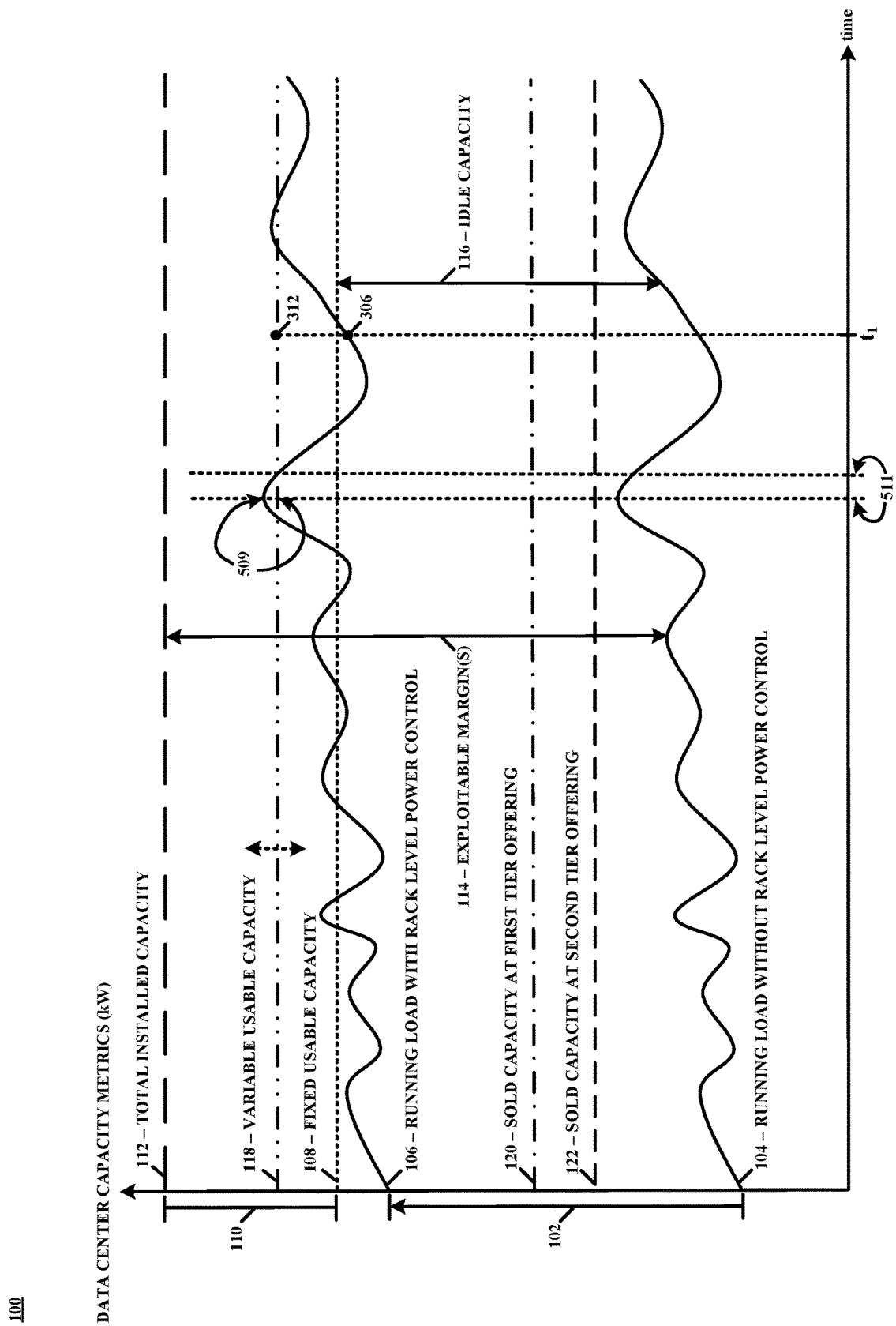
FIG. 1 shows a plot of first data center capacity metrics according to the disclosure.

FIG. 1 shows an example plot 100 of data center capacity metrics according to the disclosure, which relates to data center power control. More specifically, the disclosure relates to techniques for allocating data center power capacity among data center customers with tiered availability using data center power capacity installed for power resiliency or power available due to instant load conditions. This is illustrated in plot 100 (not necessarily drawn to scale) as a shift 102 along the ordinate from a first trace 104 to a second trace 106, where first trace 104 and second trace 106 represent, respectively, an example of data center running load without and with "rack level power control" as contemplated throughout. Thus, first trace 104 represents data center running load according to conventional implementations and second trace 106 represents data center running load according to the disclosure.

More specifically, in conventional implementations, without rack level power control as illustrated by first trace 104 in plot 100, running load in a data center is generally prevented from exceeding levels greater than fixed usable capacity 108. This is because a buffer 110 of total installed capacity 112 at the data center is typically reserved as available only for fault mitigation or operational or phasing concerns (e.g., power outage, component failure, maintenance, etc.) where, in practice, level or magnitude of total installed capacity 112 is a function of level of resilience at the data center. For example, level of total installed capacity 112 for a fully redundant (2N) level of resilience would typically be greater than level of total installed capacity 112 for a parallel redundant (N) level of resilience at the data center. For these and other redundancy schemes (e.g., 2N+1, N+R, etc.), however, a substantial fraction of total installed capacity 112 at the data center is at any particular time unused or unsold, or otherwise idle, in conventional implementations. This is represented by exploitable margins 114 in plot 100, that at a minimum includes buffer 110 of total installed capacity 112.

In contrast, with rack level power control as illustrated by second trace 106 in plot 100, running load in the data center is not prevented from exceeding levels greater than fixed usable capacity 108. Thus, the techniques of the present disclosure leverage or make available for use capacity associated with exploitable margins 114, and at a minimum capacity associated with buffer 110 of total installed capacity 112. Although, shift 102 may be substantial such that the gap between first trace 104 and fixed usable capacity 108, represented as idle capacity 116 in plot 100, is in practice minimized via application of the principles of the present disclosure. To prevent capacity oversubscription (where instantaneous demand is greater than available supply), and as discussed in detail below, running load in the data center is prevented from exceeding levels greater than variable usable capacity 118 as shown in plot 100, which in practice may fluctuate (indicated by arrow in FIG. 1) anywhere to levels less than total installed capacity 112, whereby server racks in the data center may be commanded to self-configure resources to operate at reduced (or increased) power supply levels based upon service level agreements and instantaneous level of variable usable capacity 118.

The service level agreements may include tiered power availability contracts including at least a third tier contract for a certain level of power (e.g., 10 kW) at a maximum (realizable) availability offering (e.g., 99.999%) and a second tier contract for a certain level of power (e.g., 5 kW) at an availability offering that is less than the maximum availability offering (e.g., 95.0%). A third trace 120 and a fourth trace 122 in plot 100 represent, respectively, an example of sold (sum total) capacity for a third tier contract and for a second tier contract in accordance with the disclosure, whereby the sum of levels associated with third trace 120 and fourth trace 122 (in the present example only) correlates with shift 102. Further, the service level agreements may be associated with a priority that is a function of the tiered power availability contracts that define the service level agreements, and those server racks of a plurality of server racks that are associated with service level agreements that have a priority lower or less than other server racks may be the first to be commanded to self-configure resources to operate at reduced power supply levels in event that instantaneous power demand is as measured or is as forecasted to be greater than available power supply, as may occur during or under power outage, component failure, maintenance or other circumstances. Thus, the present disclosure relates to techniques for allocating data center power capacity among data center customers with tiered availability using data center power capacity installed for power resiliency or any other purpose. Data center running load is permitted to reach levels within buffer 110 as illustrated in FIG. 1. Although not so limited, an appreciation of the various aspects of the disclosure may be gained from the following discussion provided in connection with the drawings.

Figure 2:
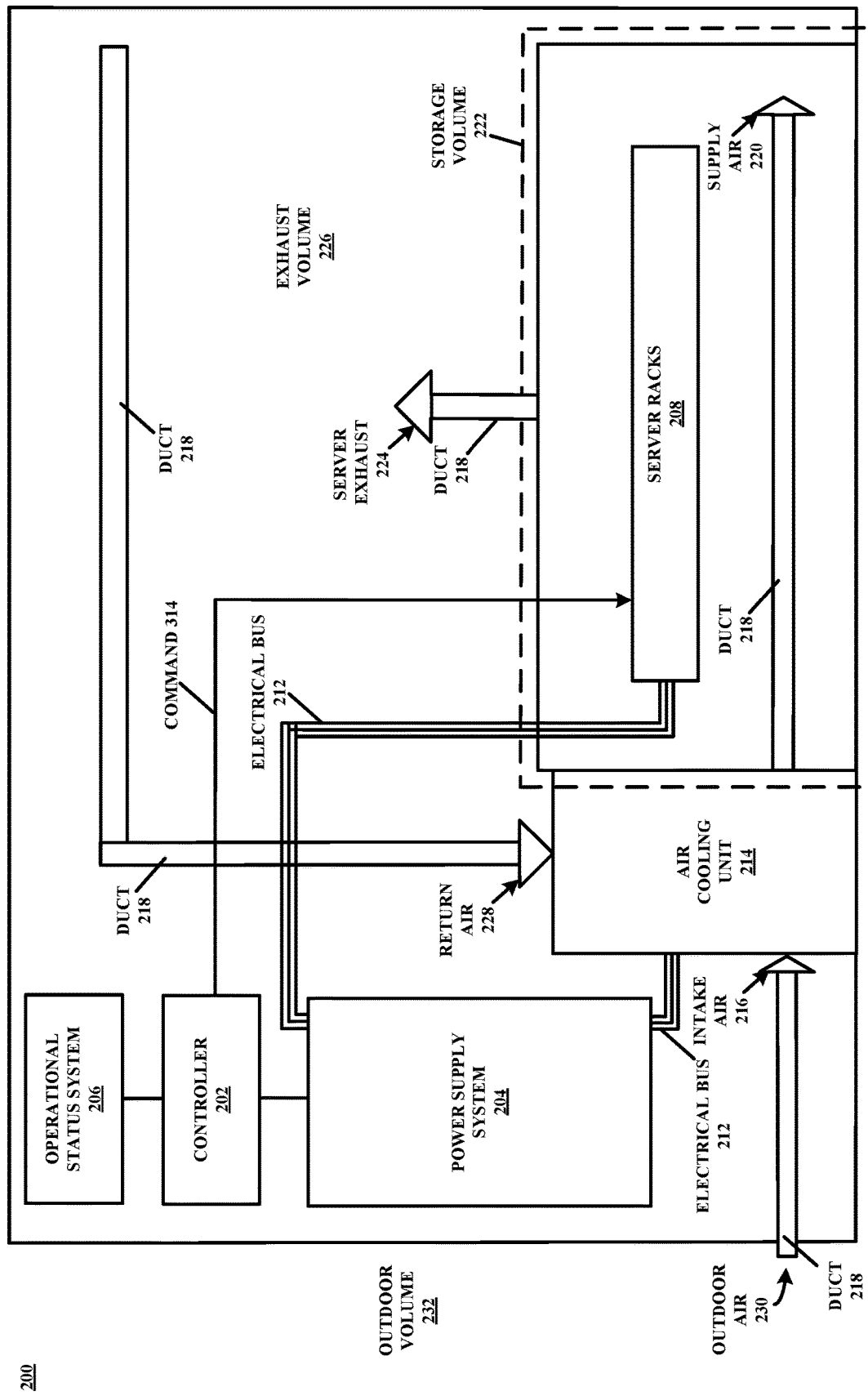
FIG. 2 shows a layout of a data center according to the disclosure.

For example, FIG. 2 shows an example layout of a data center 200 according to the disclosure. More specifically, a controller 202 is configured to interrogate a power supply system 204 and an operational status system 206 and determine, simultaneously and at periodic machine-time intervals (e.g., microsecond, millisecond, etc.) for example, whether power supply system 204 is capable of meeting the demands of each component of data center 200 that is configured to receive power from power supply system 204. Controller 202 is an example of a special-purpose computing device configured to implement aspects of the present disclosure, as discussed in detail below in connection with at least FIG. 8.

While in practice the architecture or topology of data center 200 may be substantially more robust and complex, in the example of FIG. 2 each one of a plurality of server racks 208 and at least one air cooling unit 214 is coupled to power supply system 204 via electrical bus 212 to receive power from power supply system 204. In this example, and in event that controller 202 determines that power supply system 204 is incapable of meeting the demands of each one of plurality of server racks 208 and air cooling unit 214, controller 202 may command at least one of plurality of server racks 208 to self-configure resources to operate at reduced (or increased or, more generally, different) power supply levels based upon service level agreements and instantaneous level of variable usable capacity 118 (see FIG. 1), as discussed in detail below in connection with at least FIG. 3.

Data center 200 further includes storage volume 222 that stores server racks 208. In operation, air cooling unit 214 receives intake air 216 via duct 218 (lower left, FIG. 2), and cools intake air 216 and supplies supply air 220 to storage volume 222, and server exhaust 224 is released from server racks 208. Warm air, including server exhaust 224, in exhaust volume 226 is returned as return air 228 via duct 218 to be cooled and recirculated by air cooling unit 214. Data center 200 may be a facility for storing one or more electronic devices, such as server racks 208, network and storage gear, as well as power distribution units (PDUs) that may be incorporated within or on one or more of server racks 208, or any other suitable electronic or supporting devices according to particular needs in the context of data center operations. As an example, a PDU, equivalently a special-purpose computing device, incorporated within a particular one of server racks 208 may be configured and/or arranged to self-configure and meter or throttle level of power delivered or routed to one or more server computers incorporated within or on the particular one of server racks 208 in response to a command received from controller 202, as discussed in detail below in connection with at least FIG. 4.

Data center 200 may be situated in a stand-alone building used primarily or exclusively for data center 200, or may be situated in a portion of a larger building used for other uses including office space, residential space, retail space or any other suitable use. Data center 200 may be in an urban, suburban, or rural location or any other suitable location with any suitable climate. Data center 200 may provide an operating environment for co-location, interconnection, and/or other services. For example, data center 200 may provide an operating environment for any number of services that may be categorized according to service types, which may include, for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

As mentioned, storage volume 222 of data center 200 may be used to store server racks 208. In addition, storage volume 222 may store network and/storage gear or any other suitable electronic or supporting devices. Because server racks 208 typically operate more efficiently and/or reliably within a temperature range exceeded by the temperature of heat exhaust produced by server racks 208 and/or other devices stored in storage volume 222, it may be desirable to keep air in storage volume 222 within the temperature range. Storage volume 222 may include one or more racks, cabinets, cages, or other storage devices housing server racks 208 and/or any other computing equipment. Storage devices for server racks 208 may be arranged in rows within storage volume 222. Rows may be positioned between "cold aisles" for supplying cool supply air 220 to server racks 208 and "hot aisles" for collecting server exhaust 224 and diverting server exhaust 224 to exhaust volume 226. In the example of FIG. 2, server racks 208 are located "behind" a cold aisle for supplying cool supply air 220 and server racks 208 are located "in front of" a hot aisle for collecting and diverting server exhaust 224 to exhaust volume 226.

Server racks 208 may be systems that respond to requests across a computer network to provide, or help to provide, a network or data service, or to throttle power provided to electronics incorporated thereon as discussed in detail below in connection with at least FIG. 6. Each one of server racks 208 may hold rack servers or other computing devices having one or more processors that execute software that is capable of accepting requests from clients (devices). Requests from clients may be to share data, information, or hardware and software resources. Server racks 208 may hold one or more of a database server, file server, mail server, print server, web server, gaming server, application server, communication server, compute server, media server, or any other suitable type of server that may be employed by a data center provider or tenant of the data center provider, according to particular needs. Server racks 208 may hold specialized or general-purpose devices. Server racks 208 may hold x86 or other real or general-purpose server computing or computer devices configured to apply and/or offer services to customers. Server racks 208 may also hold special-purpose appliances or controllers for providing interconnection services between customers of a co-location facility provided by data center 200 or for providing any other suitable services according to particular needs. Servers held by server racks 208 may use any suitable operating system including Unix-like open source distributions, such as those based on Linux and FreeB SD, Windows Server, or any other suitable operating system, virtualization or containerization platform.

Intake air 216 may be air that is supplied to storage volume 222 to keep air within storage volume 222 and surrounding server racks 208 relatively cool, such that server racks 208 may be maintained at a temperature within a preferred operating temperature range for the server racks 208. Although described throughout as "air," intake air 216 may be any suitable composition of gas for cooling devices within storage volume 222. Intake air 216 may be supplied by cooling return air 228 or any other suitable air source in air cooling unit 214 or by drawing air from a source of air that is already cool such as, for example, outdoor air 230 from outdoor volume 232 in a location with a cool climate. For example, for data center 200 in New York in the winter, intake air 216 may be supplied by drawing outdoor air 230 in from outdoor volume 232, outside data center 200.

Air cooling unit 214 may be a unit for cooling and circulating cool intake air 216 in storage volume 222. Any number of cooling units 214 may be used to provide cool intake air 216 to storage volume 222. In certain examples, air cooling unit 214 may cool air from return air 228 and recirculate the air as cool supply air 220 in storage volume 222. In some cases, air cooling unit 214 may draw air from another source, such as outdoor air 230 from outdoor volume 232 outside data center 200, to supply as cool supply air 220 to storage volume 222. For example, in certain locations where the climate is relatively cool during at least part of the year, air cooling unit 214 may draw outdoor air 230 from outdoor volume 232 during those parts of the year, and may supply that air as cool supply air 220 to storage volume 222. Air cooling unit 214 may do this in addition to, or alternatively to, cooling return air 228 to supply as cool supply air 220. For example, cool intake air 216 may be supplied partly from cooling return air 228 and partly from outdoor air 230 drawn from outdoor volume 232 when outdoor volume 232 has a cool temperature. Air cooling unit 214 may alternate from drawing outdoor air 230 from outdoor volume 232 during times of cool outdoor volume 232 temperatures to cooling return air 228 during times of warm outdoor volume 232 temperatures.

Figure 3:
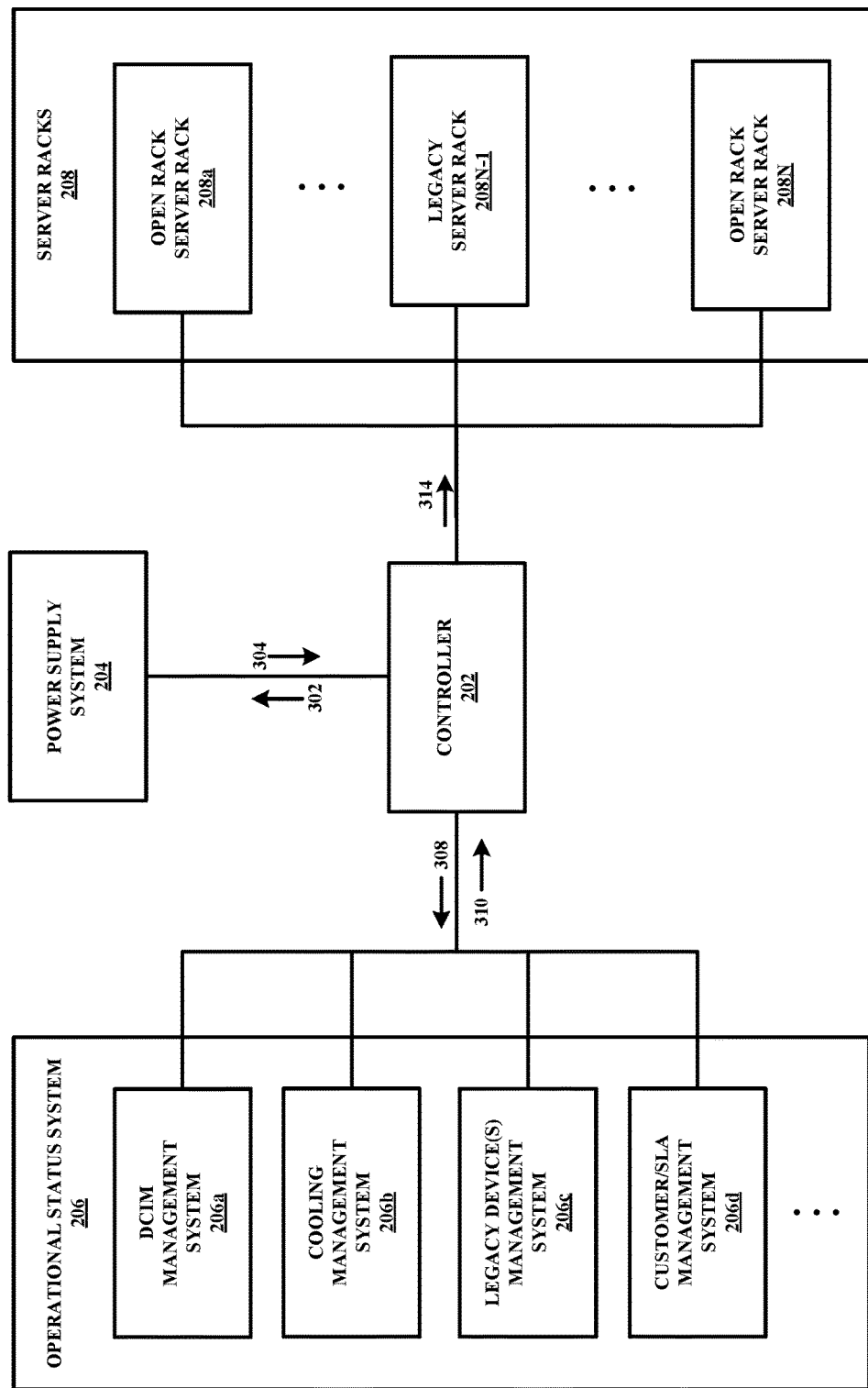
FIG. 3 shows aspects of the data center of FIG. 2 in first alternate detail.

As mentioned above, controller 202 is configured to interrogate power supply system 204 and operational status system 206 and determine whether power supply system 204 is capable of meeting the demands of each component in data center 200 that is configured to receive power from power supply system 204. In practice, controller 202 may be implemented as hardware, software, or firmware, or any combination thereof. Functionality implemented by controller 202, or any other power management aspect of the present disclosure, may be optionally integrated with a Container Orchestrator system that can take advantage of the aspects of the present disclosure by moving compute containers to another data center when limits are approached in a particular data center. Regardless, in the event that controller 202 determines that power supply system 204 is incapable of meeting the demands of each one of plurality of server racks 208 and air cooling unit 214, for example, controller 202 may command or signal at least one of plurality of server racks 208 to self-configure resources to operate at reduced (or increased) power supply levels based upon service level agreements and instantaneous level of variable usable capacity 118 (see FIG. 1). FIG. 3, which shows aspects of data center 200 of FIG. 2 in first alternate detail, is illustrative of an architecture that supports such an implementation, although other examples are possible.

For example, and with collective reference to FIG. 1-3, controller 202 may query 302 (see FIG. 3) power supply system 204 to obtain, via response 304, information for controller 202 to calculate an instantaneous value 306 (see FIG. 1) for running load in data center 200 at time $t_1$. Further, controller 202 may query 308 operational status system 206 to obtain, via response 310, information as to status of a plurality of resources of data center 200, including information collected or aggregated by at least one of a DCIM (Data Center Infrastructure Management) management sub-system 206a, a cooling management sub-system 206b (e.g., as provided by a Vigilent® platform), a legacy device management sub-system 206c (e.g., branch circuit monitoring information) and a customer or service level agreement management sub-system 206d, which may correspond to a database of service level agreements or contracts associated with at least one of plurality of server racks 208, discussed in further detail below. Additional details of a DCIM management sub-system are found in U.S. patent application Ser. No. 15/404,015, filed Jan. 11, 2017, and titled "Architecture for Data Center Infrastructure Monitoring," which is incorporated by reference herein in its entirety.

While not necessarily exhaustive as the type and number of sub-systems of operational status system 206 may evolve as technology evolves, controller 202 may subsequently (e.g., within one or more machine cycles) calculate an instantaneous value 312 (see FIG. 1) for variable usable capacity 118 in data center 200 at time $t_1$ (e.g., for time $t_1$, but calculated or determined one or more machine cycles subsequent to time $t_1$), and then command 314 (see FIGS. 2-3) at least one of plurality of server racks 208 to self-configure resources to operate at reduced (or increased) power supply levels based upon service level agreements and instantaneous level of variable usable capacity 118 as derived from response 310. In one example, at least two of plurality of server racks 208, referenced as 208a and 208N in FIG. 3, where N is an arbitrary integer value that represents a total number of server racks 208, may be configured as defined by one or more specifications or design guides as updated and disseminated by the Open Compute Project (e.g., via opencompute.org). However, in addition to "Open Compute" racks, some of server racks 208 may be configured in accordance with the "Open19 Project" while others of server racks 208 may be configured in accordance with "traditional" or "legacy" standards or specifications but augmented with additional capabilities in accordance with the principles of the present disclosure.

Figure 4:
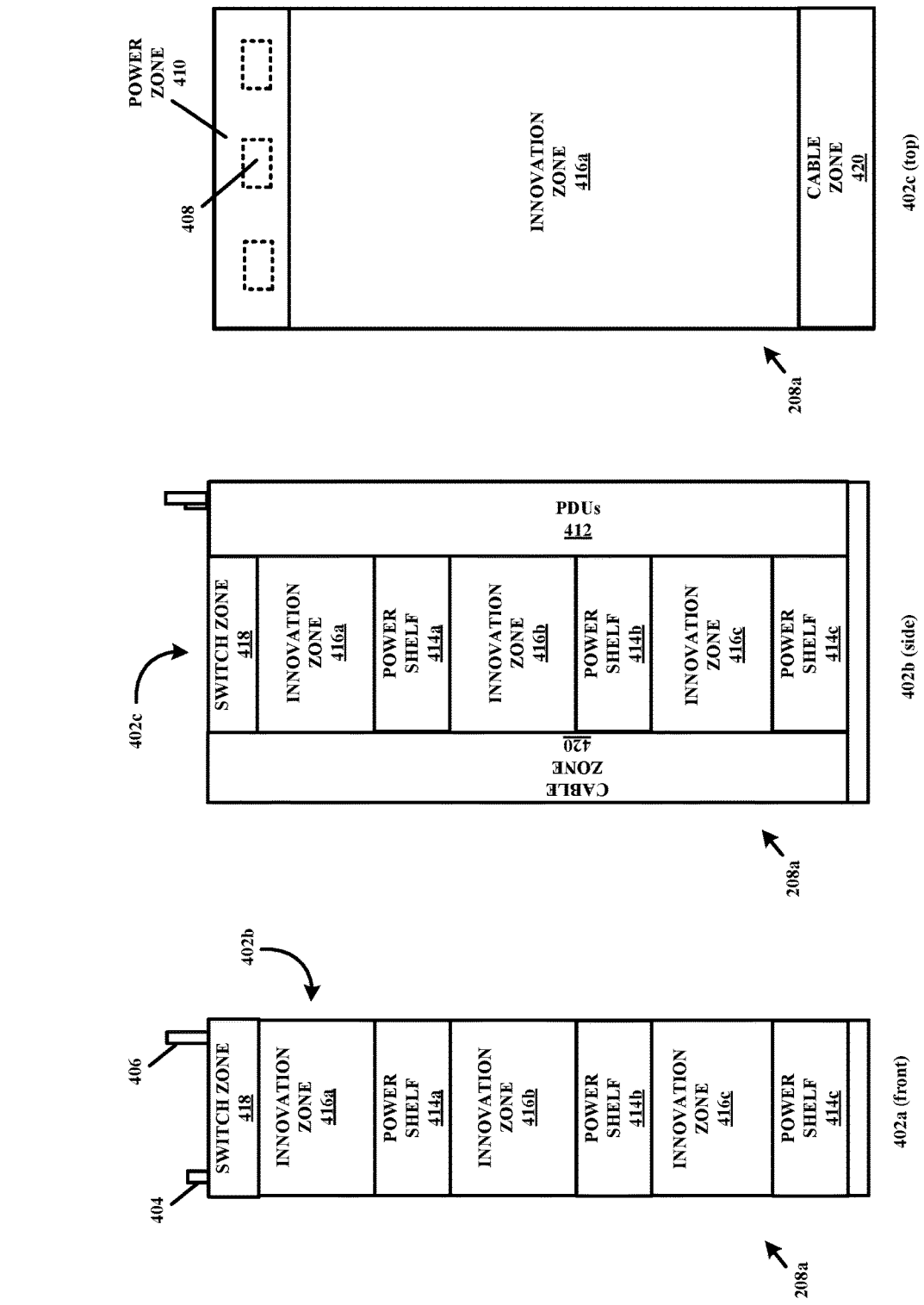
FIG. 4 shows aspects of the data center of FIG. 2 in second alternate detail.

Some instances of data center 200 may include a heterogenous mix of racks that support flexible power SLAB according to techniques described herein and racks that do not provide such support. Accordingly, controller 202 may treat each rack within data center 200, as mentioned above with reference to FIG. 2, as a legacy-type rack or new-type of rack in accordance with the principles of the present disclosure, where a legacy-type rack may not necessarily be configured to support each and every aspect of present disclosure, in contrast with a new-type rack that is configured to support one or more aspects of present disclosure. FIG. 4, which shows aspects of data center 200 of FIG. 2 in second alternate detail, is illustrative of an architecture that supports an Open Compute implementation, although other examples are possible as discussed above.

Specifically, FIG. 4 illustrates server rack 208a of FIG. 3 in multiple perspective views 402a-c, whereby server rack 208a may be configured as defined by one or more specifications or design guides as updated and disseminated by the Open Compute Project, and thus server rack 208a may comprise an AC power-in terminal 404, a DC power-in terminal 406, a plurality of DC bus bars 408, and a number of "zones" in the terminology of Open Compute. For example, server rack 208a as illustrated comprises a power zone 410 that in operation receives power provided by power supply system 204 (see FIG. 3) into AC and DC power distribution units (PDU), referred to as PDUs 412 in FIG. 4, which in turn distribute power to each one of a plurality of power shelves 414a-c that may include hot-swap power supplies that are serviceable from the cold aisle within storage volume 222 (see FIG. 2). Further, PDUs 412 may be configured and/or arranged to self-configure and meter or throttle level of power delivered or routed to one or more server computers incorporated within or on server rack 208a in response to command 314 (see FIG. 3) received from controller 202, as discussed in more detail below in connection with at least FIG. 6.

Power is distributed from power shelves 414a-c along corresponding ones of (12V) bus bars 408 to corresponding ones of innovation zones 416a-c that in practice house or store the mentioned server computers. Server rack 208a further comprises a switch zone 418 and a cable zone 420. In general, while server rack 208a is described as configured according to the Open Rack hardware specification, any particular one of server racks 208, such as server rack 208N-1 in FIG. 3, may be configured as a "legacy" server rack for being incapable of or unable to (is not necessarily compatible or configured and/or arranged) to self-configure based upon command 314 received from controller 202 in a manner as contemplated throughout. In this manner, configuration of server racks 208 need not necessarily be homogeneous across all of server racks 208 within data center 200 but instead there may be heterogeneity of legacy-type and new-type racks within data center 200 with respect to server racks 208.

Further details of configuration of server rack 208a may at least be found in the Open Rack hardware specification as updated and disseminated by the Open Compute Project. "Open Rack Standard," version 2.0, published by the Open Compute Project, is hereby incorporated by reference. Although, it is contemplated that other configurations (e.g., as per the Open19 Project) are possible and that the features or aspects of the present disclosure may be applicable to other such configurations. An aspect or feature that may be consistent between implementation-specific server rack configurations may include one or more components that is or are addressable and programmable so as to enable any particular server rack to self-configure based upon command 314 received from controller 202 in a manner as discussed above and in further detail below in connection with FIG. 5.

Figure 5:
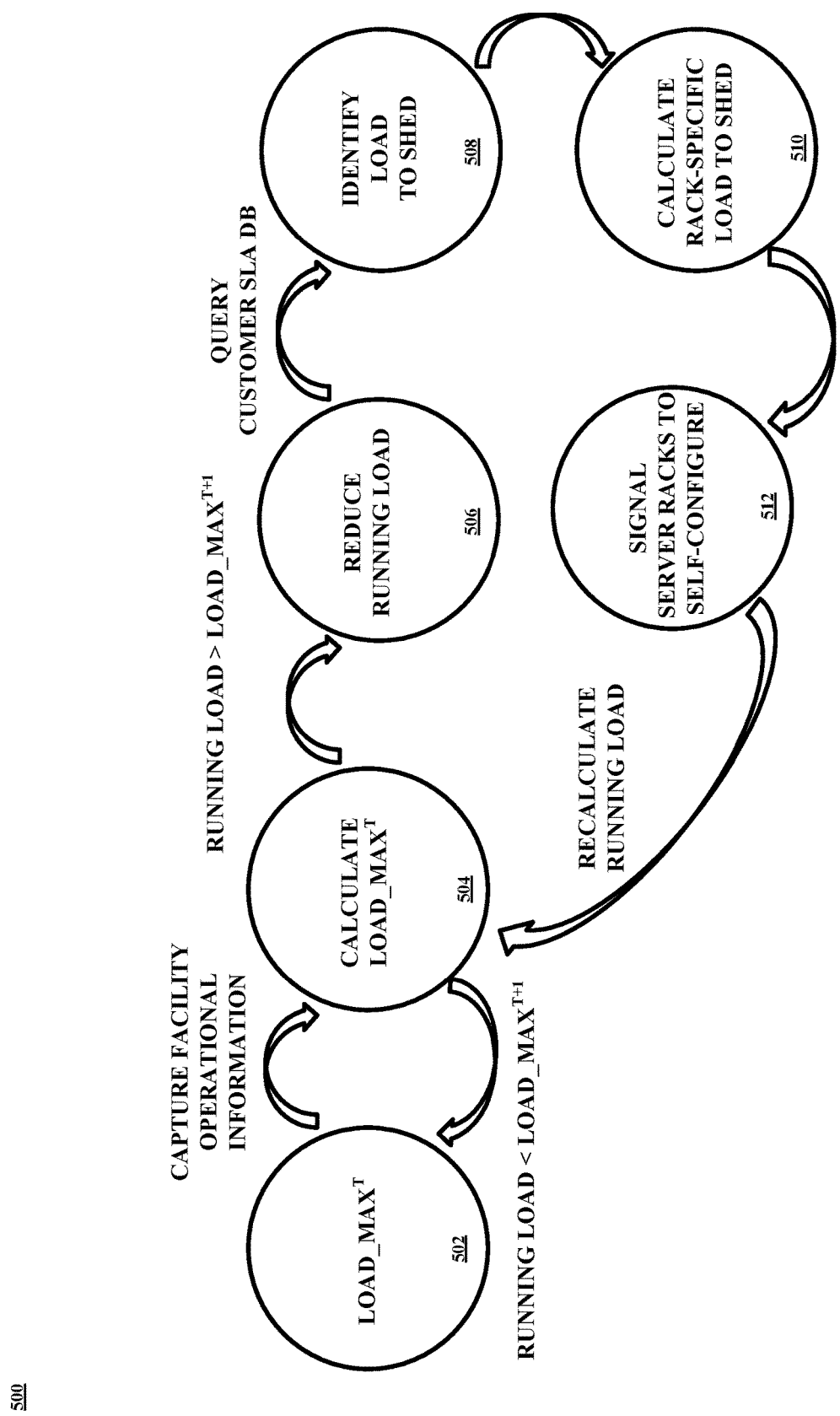
FIG. 5 shows a state diagram according to the disclosure.

Specifically, FIG. 5 shows an example state diagram 500 according to the disclosure. In particular, at initial state 502, controller 202 may calculate, at a time T, a value for variable usable capacity 118, which in the example of FIG. 5 is represented by a variable $LOAD\_MAX^T$ and may be calculated in a manner similar to discussed above with respect to instantaneous value 312 (see FIG. 1). On transition from state 502 to state 504, controller 202 may query power supply system 204 and operational status system 206 to obtain information as to running load in data center 200 at time T, in addition to information as to status of a plurality of resources of data center 200 in a manner similar to that discussed above in connection with FIG. 3.

At state 504, controller 202 may calculate an instantaneous value for running load in data center 200 (e.g., value 306 in FIG. 1) as well as a value for variable usable capacity 118 for a time T+1, where "+1" is intended to represent any particular increment of time, such as 1 millisecond or 5 milliseconds (programmable) for example, which in the example of FIG. 5 is represented by a variable LOAD_MAX$^{T+1}$. Thus, the variable LOAD_MAX$^{T+1}$ is an example of a forecasted or projected value for variable usable capacity 118, and is calculated based on a priori knowledge of status of various resources of data center 200. As mentioned above, variable usable capacity 118 in practice may fluctuate anywhere to levels less than total installed capacity 112, also to levels within buffer 110, such as may occur in power outage scenarios, load spike scenarios, scenarios where a power supply component is taken offline for maintenance, and etc.

As long as the value for running load in data center 200 is evaluated as less than (or equal to) the variable LOAD_MAX$^{T+1}$, a loop is maintained between state 502 and 504 as illustrated in FIG. 5. If, however, the value for running load in data center 200 is evaluated as greater than (or equal to) the variable LOAD_MAX$^{T+1}$, a transition from state 504 to state 506 occurs. At state 506, controller 202 may apply an algorithm of operations to reduce running load in data center 200 to prevent capacity oversubscription and, on transition from state 506 to state 508, controller 202 may query operational status system 206 to obtain service level agreement information associated with at least one of plurality of racks 208 that is configured as defined by one or more specifications or design guides as updated and disseminated by the Open Compute Project for example.

The service level agreement information, equivalently, service level agreements, may each include information associated with tiered power availability contracts including at least a third tier contract for a certain level of power (e.g., 10 kW) at a maximum availability offering (e.g., 99.999%) and a second tier contract for a certain level of power (e.g., 5 kW) at an availability offering that is less than the maximum availability offering (e.g., 95.0%), as mentioned above. Further, the service level agreements may be associated with a priority that is a function of the tiered power availability contracts that define the service level agreements, and those server racks of a plurality of server racks that are associated with service level agreements (e.g., 208a-c, 208N as per Table 1 below) that have a priority lower than other server racks may be the first to be commanded to self-configure resources to operate at reduced power supply levels in the event that instantaneous power demand is or is forecasted to be greater than available power supply, as may occur under power outage, component failure, maintenance, power usage increase, or other circumstances. An example of such is tabulated in Table 1.

TABLE 1

| Server Rack | Service Level Agreement/Priority | Power Level (kW) | Availability (%) |
| --- | --- | --- | --- |
| 208a | Tier 3 | 10 | 99.999 |
| 208b | Tier 3 | 10 | 99.999 |
| 208c | Tier 2 | 10 | 98.0 |
| 208a | Tier 1 | 5 | 95.0 |
| 208N | Tier 1 | 5 | 95.0 |

As illustrated in Table 1, server rack 208a is associated with a third tier contract for 10 kW power at 99.999% availability as well as a first tier contract for 5 kW power at 95.0% availability, server rack 208b is associated with the third tier contract for 10 kW power at 99.999% availability, server rack 208c is associated with a second tier contract for 10 kW power at 98.0% availability, and server rack 208N is associated with the first tier contract for 5 kW power at 95.0% availability. Regarding server rack 208a, power level sum (15 kW in this example) may be referred to as the effective capacity of server rack 208a, and the power level associated with the third tier contract may be referred to as "additional capacity" that may be provided by a particular power shelf 414 (see FIG. 4, where power shelf 414 includes a stack of batteries) of server rack 208a as an availability buffer to maintain 15 kW at 99.999% if needed. In event that instantaneous power demand is or is forecasted to be greater than available power supply, server rack 208N may be the first to be commanded by controller 202 to self-configure resources to operate at reduced power supply levels to reduce running load in data center 200, as Tier 1 naturally may be associated with a priority level that is less than Tier 2 and Tier 3. A more detailed example of such an implementation is discussed below in connection with at least FIG. 7.

If, however, and for example, throttling power usage of server rack 208N alone does not or is insufficient to prevent capacity oversubscription, then server rack 208a may be the second in sequence to be commanded by controller 202 to self-configure resources to operate at reduced power supply levels to reduce running load in data center 200, as server rack 208a is associated with a first tier contract for 5 kW power at 95.0% availability, while server rack 208a is simultaneously ensured service according to the third tier contract for 10 kW power at 99.999% if not only from power supply system 204 but also from batteries in power shelf 414 if needed. If, however, and for example, throttling power usage of server rack 208N and 208a does not prevent capacity oversubscription, then server rack 208c may be the third in sequence to be commanded by controller 202 to self-configure resources to operate at reduced power supply levels to reduce running load in data center 200, as server rack 208c is associated with a second tier contract for 10 kW power at 98.0% availability, while again server rack 208a is simultaneously ensured service according to the third tier contract for 10 kW power at 99.999%.

Such an algorithm of operations may be repeated until normal operating conditions are restored for example in data center 200 and, in general, such an implementation is enabled as server racks 208a-c, N in the present example are configured as defined by one or more specifications or design guides as updated and disseminated by the Open Compute Project, where PDUs 412 (see FIG. 4) of each one of server racks 208a-c, N may communicate with controller 202 and, in response to command 314, self-configure resources such that server racks 208a-c, N may operate at reduced (or increased) power supply levels. Benefits and advantages flow from such an implementation. For example, from the perspective of a customer, a tiered-pricing structure that flows from such an implementation (e.g., Tier 3 may be more expensive to contract than Tier 2, etc.) may ultimately translate into less cost for contracting power and cooling (e.g., due to more paying customers), while a tailored service level agreement may be designed to best suit customer-specific power supply requirements. From the perspective of a provider, more customers in general may be serviceable and ultimately drawn into contract agreements at data center 200 due to the increase in available power capacity that flows from such an implementation (see FIG. 1), while resources that would otherwise remain unsold or unused or idle may be exploited and monetized.

Referring again to FIG. 5, and as mentioned above, at state 506 controller 202 may instantiate an algorithm to reduce running load in data center 200 to prevent capacity oversubscription and, on transition from state 506 to state 508, controller 202 may query operational status system 206 to obtain service level agreement information associated with at least one of plurality of server racks 208 that is configured as defined by one or more specifications or design guides as updated and disseminated by the Open Compute Project for example. At state 508, controller 202 may calculate a value 509 (see FIG. 1) of load to shed such that running load in data center 200 is maintained at levels at or below variable usable capacity 118.

At state 510, controller 202 may calculate a weighted spread or average of value 509 in order to selectively distribute load to be shed among ones of server racks 208a-c, N, according to corresponding service level agreements and in the example of FIG. 5. For example, server rack 208N may be assigned to throttle a greater amount of power usage compared to server rack 208c as per the service level agreements defined in Table 1. At state 512, controller 202 may transmit command 314 to one or more of server racks 208a-c, N to self-configure resources to operate at reduced (or increased) power supply levels such that running load in data center 200 is maintained at levels at or below variable usable capacity 118. A loop defined between state 504 to state 512 may ensure that within a particular time interval 511 (see FIG. 1), which is a function of the "+1" in time T+1 (programmable), running load in data center 200 is reduced to levels at or below variable usable capacity 118. In practice, communication between controller 202 and server racks 208, as well as other components of data center 200, to facilitate such an implementation as discussed in the context of FIG. 5 may occur over a network(s). FIG. 6, which shows data center 200 of FIG. 1 in third alternate detail, is illustrative of such an example implementation, and FIG. 7, which shows a plot 700 of second data center capacity metrics according to the disclosure, is illustrative of an example scenario whereby controller 202 responds to fluctuation in running load in data center 200 and distributes load to be shed among ones of server racks 208 according to corresponding service level agreements.

More specifically, and with collective reference to FIGS. 1-7, FIG. 6 shows controller 202 that is configured to interrogate power supply system 204 and operational status system 206 via a network 602 and determine whether power supply system 204 is capable of meeting the demands of each one of plurality of server racks 208 and air cooling unit 214. In this example, and in event that controller 202 determines that power supply system 204 is incapable of meeting the demands of each one of plurality of server racks 208 and air cooling unit 214, controller 202 may command via network 602 at least one of plurality of server racks 208 to self-configure resources to operate at reduced (or increased) power supply levels based upon service level agreements and instantaneous level of variable usable capacity 118. For example, first trace 106 of FIG. 1 is reproduced in plot 700 (not necessarily drawn to scale) of FIG. 7, along with total installed capacity 112 and variable usable capacity 118 that in practice may fluctuate (indicated by arrow in FIG. 7) anywhere to levels less than total installed capacity 112. As such, a variable buffer 702 is developed and it is contemplated that variable buffer 702 may guarantee that running load in data center 200 does not meet or reach a level associated with a level of total installed capacity 112. As another mechanism, however, to ensure that running load in data center 200 does not meet or reach a level associated with a level of total installed capacity 112, controller 202 may implement an algorithm of operations consistent with that as shown and described in connection with at least FIG. 5.

For example, controller 202 may query 604 (see FIG. 6) power supply system 204 to obtain, via response 606, information for controller 202 to calculate an instantaneous value 704 (see FIG. 7) for running load in data center 200 at time $t_1$. Subsequently or in parallel (in time), controller 202 may calculate an instantaneous value 706 for variable usable capacity 118 in data center 200 at time $t_1$. Controller 202 may periodically, on machine-level intervals, calculate an instantaneous value 706 for variable usable capacity 118, but variable usable capacity 118 may in general be relatively constant due to the nature of criterion that may govern level of variable usable capacity 118 in practice (e.g., power outage, component failure, maintenance or other circumstances that may be relatively rare or intentional). Nevertheless, controller 202 may determine that instantaneous value 704 for running load in data center 200 is less than instantaneous value 706 for variable usable capacity 118 at time $t_1$ by a level (difference) such that probability for capacity oversubscription is minimal.

Within one or more machine cycles (programmable), controller 202 may again query power supply system 204 to obtain, via response, information for controller 202 to calculate an instantaneous value 708 for running load in data center 200 at time $t_2$. Subsequently, or in parallel, controller 202 may calculate an instantaneous value 710 for variable usable capacity 118 in data center 200. In this example, controller 202 may determine that instantaneous value 708 for running load in data center 200 is less than instantaneous value 710 for variable usable capacity 118 at time $t_2$, but also that a rate by which running load in data center 200 is increasing, as represented by slope (first derivative) 712 in plot 700, has reached a threshold level such that probability for capacity oversubscription is likely even though variable buffer 702 is established. Thus, at time $t_2$, controller 202 may apply an algorithm of operations to reduce running load in data center 200 to prevent capacity oversubscription, consistent with the loop defined between state 504 to state 512 of FIG. 5, discussed here in more example detail.

For example, at time $t_2$, controller 202 may query 608 (see FIG. 6) operational status system 206, or a database (non-transitory memory) local to controller 202, to obtain via response 610 information as to status of a plurality of resources of data center 200 (see FIG. 3), as well as service level agreement information associated with at least one of plurality of racks 208 that is configured as defined by one or more specifications or design guides as updated and disseminated by the Open Compute Project for example. Such a data structure may have a form consistent with that as illustrated in Table 1 above. In this example, each one of server racks 208a-c, N may be associated with a particular customer of a network services exchange provider or co-location provider associated with data center 200. Although, in general, any particular one of server racks 208 may include server computers for any number of different customers and the principles of the present disclosure extend to such a circumstance.

To continue with example provided above, controller 202 may evaluate the mentioned data structure consistent with that as illustrated in Table 1, and determine that server rack 208a is associated with a third tier contract for 10 kW power at 99.999% availability as well as a second tier contract for 5 kW power at 95.0% availability (effective available capacity=15 kW), that server rack 208b is associated with the third tier contract for 10 kW power at 99.999% availability, that server rack 208c is associated with a second tier contract for 10 kW power at 95.0% availability, and that server rack 208N is associated with a first tier contract for 5 kW power at 95.0% availability. Consistent with these defined service level agreements and in the context of the present example, running load for server rack 208a prior to time $t_2$ is represented by trace 714 in plot 700 of FIG. 7, running load for server racks 208b-c prior to time $t_2$ are represented by trace 716, and running load for server rack 208N prior to time $t_2$ is represented by trace 718 in plot 700 of FIG. 7.

At time $t_2$, however, and based on evaluation of slope 712 in plot 700, controller 202 may calculate a sum value for load to shed as well as a rack-specific value to shed to selectively distribute load to be shed among ones of server racks 208a-c, N according to corresponding service level agreements (rack level power control). In practice, controller 202 may then command 612 (see FIG. 6) ones of server racks 208a-c, N to self-configure resources to operate at corresponding reduced power supply levels to reduce running load in data center 200. For example, controller 202 may calculate a load value 722 (see FIG. 7) for server rack 208N to shed, and then command PDUs 414 of server rack 208N (see FIG. 6) to self-configure resources of server rack 208N to operate at reduced power supply levels in accordance with load value 722. In one example, a pulse-width-modulation-like (binary on/off) scheme 724 may be implemented to realize a reduction in running load at server rack 208N, although other examples are possible, averaged over time.

Figure 7:
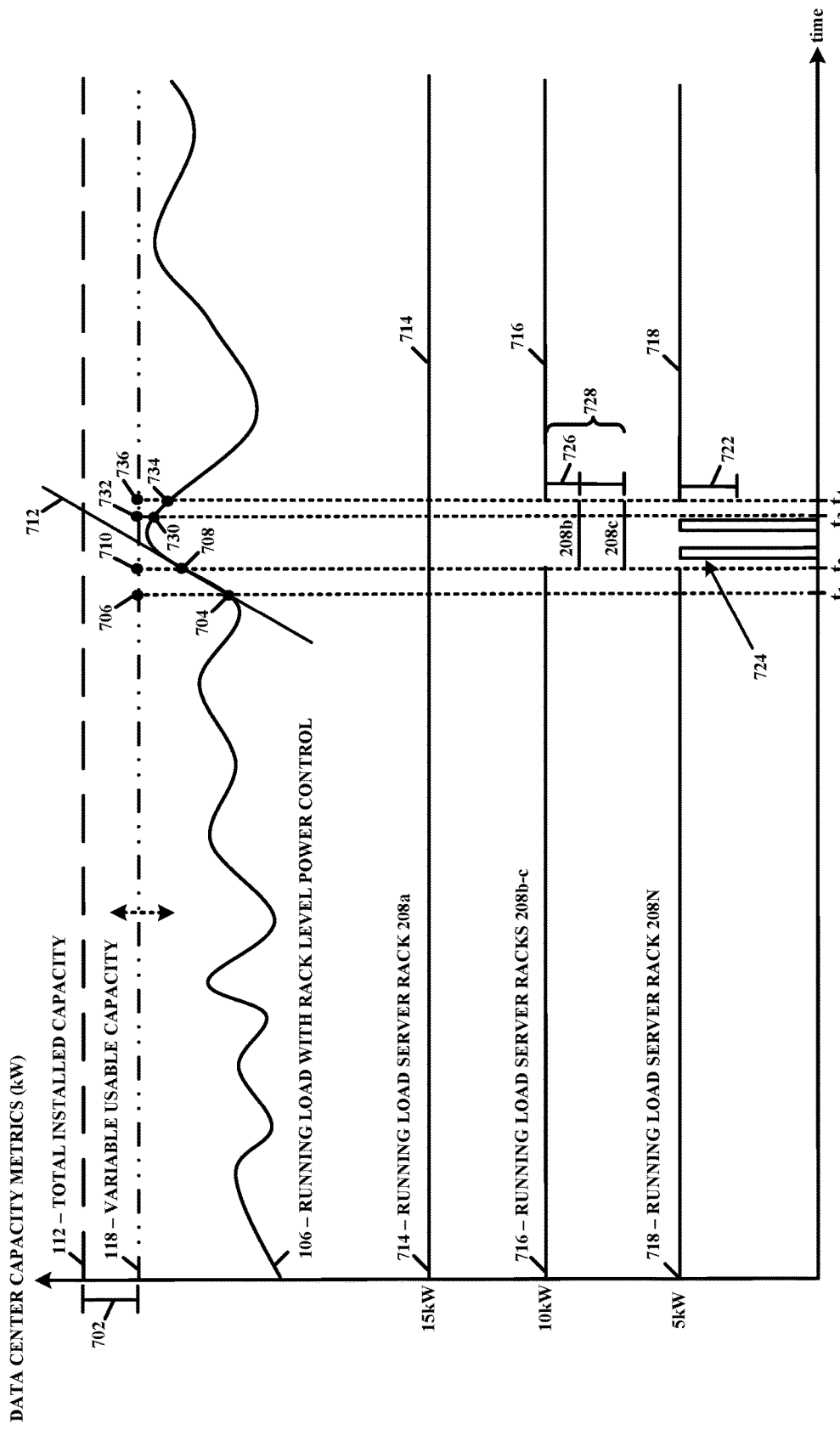
FIG. 7 shows a plot of second data center capacity metrics according to the disclosure.

For example, and based on corresponding service level agreements, controller 202 may calculate a load value 726 for server rack 208b to shed as well as a load value 728 for server rack 208b to shed, where in the present example the sum of load value 722, load value 726 and load value 726 represent the above-mentioned sum value for load to shed as calculated by controller 202. In practice, controller 202 may then command 612 ones of server racks 208b-c to self-configure resources to operate at corresponding reduced power supply levels to reduce running load in data center 200, whereby load value 726 for server rack 208b is greater than load value 728 for server rack 208b due to the tiered service level agreements as defined in Table 1. Specifically, because server rack 208b is associated with the third tier contract for 10 kW power at 99.999% availability and server rack 208c is associated with a second tier contract for 10 kW power at 95.0% availability, as illustrated in plot 700. In this example, a pulse-width-modulation-like scheme is not leveraged to realize a reduction in running load at server racks 208b-c, but controller 202 may instead command PDUs 414 of server racks 208b-c to self-configure resources to operate at reduced power supply levels directly in accordance with load value 726 and load value 728, respectively (to draw power at continuous rather than discontinuous levels). As illustrated in FIG. 7, server racks 208b-c, N, may only operate at reduced power supply levels until controller 202 determines that the trend in total running load at data center 200 is such that probability for capacity oversubscription is again minimal.

For example, within one or more machine cycles, controller 202 may query power supply system 204 to obtain, via response, information for controller 202 to calculate an instantaneous value 730 (see FIG. 7) for running load in data center 200 at time $t_3$. Subsequently or in parallel, controller 202 may calculate an instantaneous value 730 for variable usable capacity 118 in data center 200 at time $t_3$. Controller 202 may determine that instantaneous value 730 for running load in data center 200 is less than instantaneous value 732 for variable usable capacity 118 at time $t_3$ by a level (difference) such that probability for capacity oversubscription is greater than minimal.

Within one or more machine cycles, controller 202 may again query power supply system 204 to obtain, via response, information for controller 202 to calculate an instantaneous value 734 for running load in data center 200 at time $t_4$. Subsequently, or in parallel, controller 202 may calculate an instantaneous value 736 for variable usable capacity 118 in data center 200. In this example, controller 202 may determine that instantaneous value 734 for running load in data center 200 is less than instantaneous value 736 for variable usable capacity 118 at time $t_4$, but also that a rate by which running load in data center 200 is decreasing, via calculation of negative first derivative over interval $t_4$-$t_3$, has reached a threshold level such that probability for capacity oversubscription is minimal. Thus, at time $t_4$, controller 202 may command 614 (see FIG. 6) PDUs 414 of server racks 208b-c, N to self-configure resources to operate at increased power supply levels, specifically at power levels consistent with trace 716 and 718 in plot 700 of FIG. 7 prior to time $t_2$ as shown in plot 700 of FIG. 7.

In the example of FIG. 7, it is contemplated that controller 202 may command server rack 208a to self-configure resources to operate at reduced power supply levels during the $t_2$-$t_4$ interval, but that the difference between the reduced power supply levels and power levels consistent with trace 714 in plot 700 of FIG. 7 may be negligible due to the service level contracts associated with (a customer of) server rack 208a. It is further contemplated that at time $t_2$, and based on evaluation of slope 712 in plot 700, controller 202 may calculate the sum value for load to shed as well as a rack-specific value to shed (rack level power control), to selectively distribute load to be shed among ones of server racks 208a-c, N according to corresponding service level agreements, and according to any one of a number of different mathematical algorithms or functions.

For example, if data center 200 is based on a simple, non-compartmentalized design; then $Load^{MAX}$ could be calculated by taking the capacity at N; and then adding the additional capacity of the resilient components of infrastructure minus the capacity of any infrastructure not available, for instance; if data center 200 was designed on an N+1 basis; and N was 200 kW (comprised of 2×100 kW modules); then the $Load^{MAX}$ would be 300 kW. Alternatively; if data center 200 was configured on a 2N basis; and N comprised 1×200 kW module; then $Load^{MAX}$ would be calculated as 400 kW. Alternatively; a data center might be comprised of separate strings of infrastructure (for example; in a data center with two halls, each hall might be supported by separate 2N, or N+1, or N+R infrastructure); and therefore $Load^{MAX}$ in each hall would be different. $Load^{MAX}$ is continuously recalculated every unit (t) of time to forecast the maximum load at time (t+1). In the event the current load of data center 200 (measured using the DCIM system) will exceed $Load^{MAX}$ at time (t+1); then the system must reduce the load such that running load does not exceed $Load^{MAX}$. The system therefore queries the customer SLA (Service Level Agreement) database to identify racks with the lowest SLA. The system calculates the difference between running load and $Load^{MAX}$ (the required reduction) and divides the required reduction across the racks identified by the SLA database as having the lowest SLA, if the reduction is required. For example data center 200 might consist of three racks; one configured with 15 kW of power at a tier 3 (99.9999%) availability and 5 kW of power at tier 2 (99%); another rack with 20 kW of power at tier 3; and finally a third rack with 5 kW of power at tier 2 and 5 kW of power at tier 1. If the system identified that the required reduction was 10 kW; first the system would identify and signal a reduction of 5 kW to the third rack (the tier 1 load). Since an additional 5 kW reduction in load is required; the system would then identify that two racks have a tier 2 SLA. The reduction in load applied to these two racks; since they have equal SLAs, would be 2.5 kW (e.g., 5 kW/2 racks with a tier 2 SLA). The system would signal a reduction of 2.5 kW to each rack. The required reduction (10 kW) has now been achieved; and therefore no further reductions are required. When Load$^{MAX}$ is identified to have increased (and consequently an increase in power can be applied); the system operates in reverse to signal an increased limit to the racks with the highest SLA.

In accordance with the above examples, the amount of rack-specific load to shed (e.g., the magnitude of the reduced power supply level) is computed according to (Load$^{MAX}$− Running Load)/SUM(Customer Racks)$^{SLA}$), where SUM (Customer Racks)$^{SLA}$ refers to an sum amount of power drawn by Customer Racks associated with the service level agreement priority level, SLA.

Figure 6:
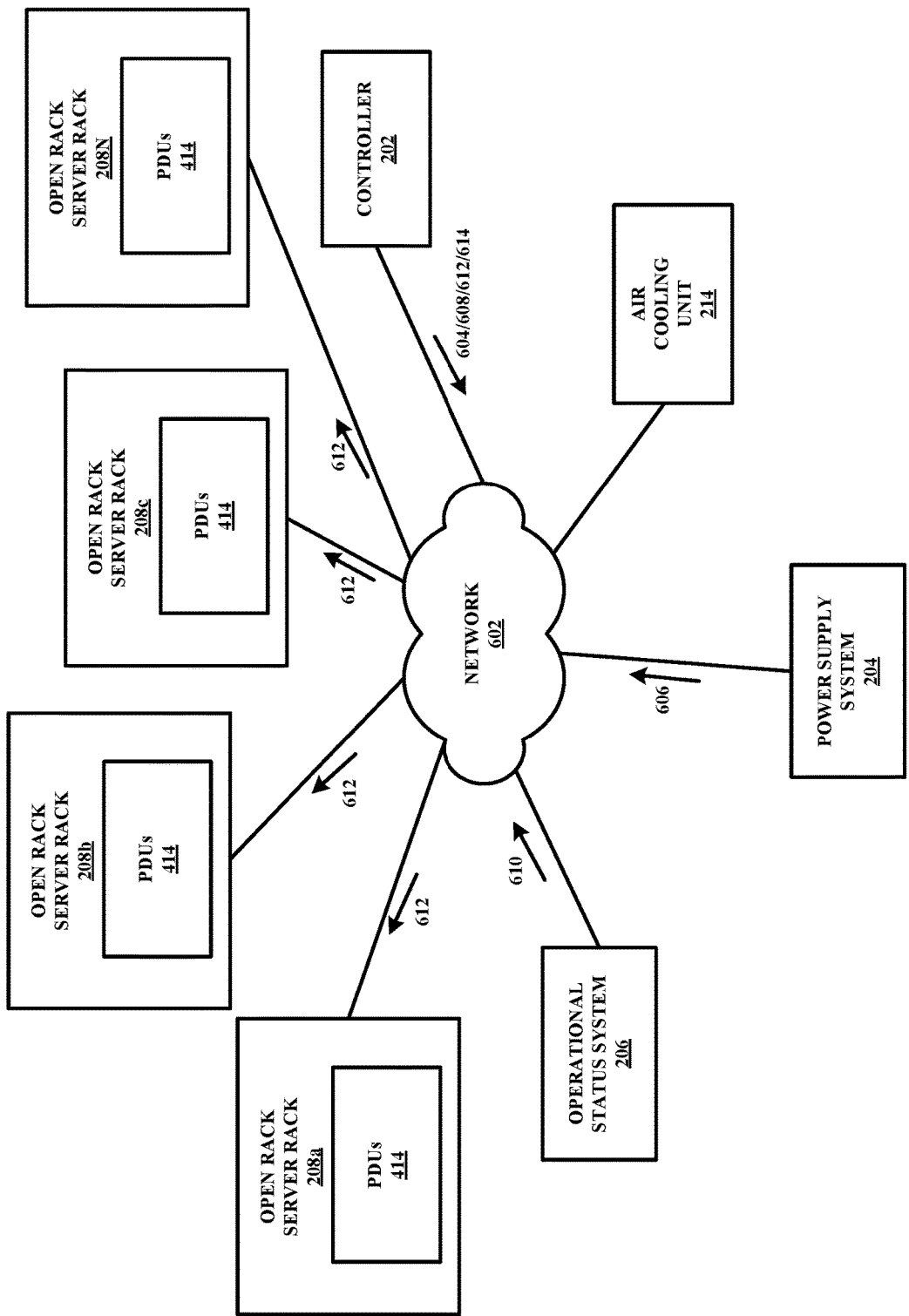
FIG. 6 shows aspects of the data center of FIG. 2 in third alternate detail.

With reference alone to FIG. 6, network 602 may in general include a private network associated with data center 200 as communications or communication sequences as discussed throughout are sensitive and secure. Further, although illustrated as a single entity, network 602 may comprise a combination of networks, wireless and/or hard-wired (analog or digital) whereby implementation specific-details of network 602 may evolve as technology evolves. Furthermore, depending on implementation, digital signaling techniques, analog signaling techniques, or any combination thereof, may be used by components within or external to data center 200 for the purpose of exploiting margins that exist between installed capacity and running load in data center 200, to make available capacity that would otherwise be reserved as back-up, or is idle, for example and thus unsold.

Figure 8:
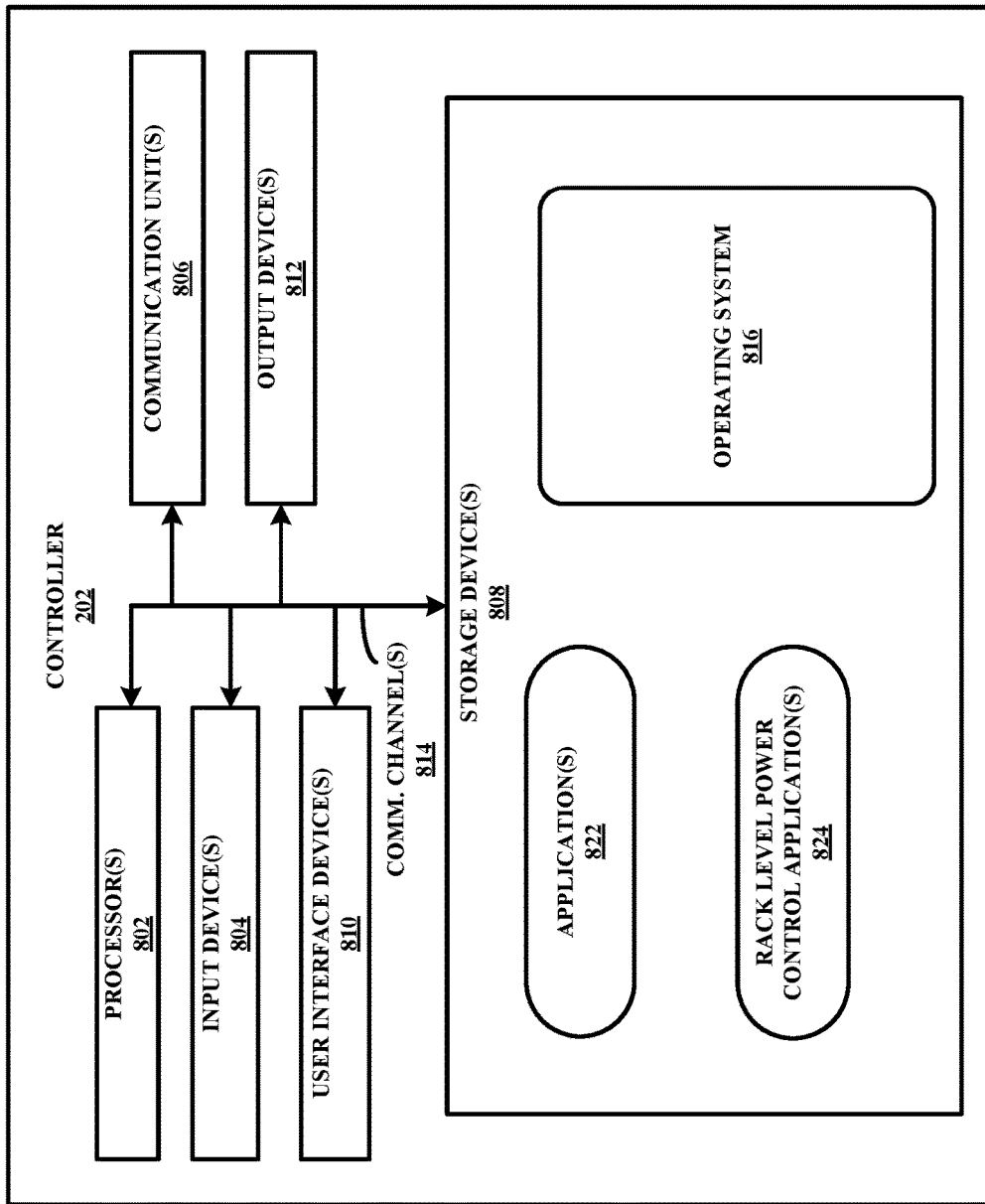
FIG. 8 shows a controller according to the disclosure.

As mentioned above, controller 202 as discussed throughout is an example of a special-purpose computing device. FIG. 8 shows an example controller according to the disclosure. More specifically, FIG. 8 is a block diagram that illustrates, in further detail, an example of controller 202 configured for allocating data center power capacity that would otherwise be unused or unsold, or is idle, in accordance with one or more techniques of the disclosure. Controller 202 may include a server or other computing device that includes one or more processor(s) 802 for executing rack level power control application 824, although controller 202 may be leveraged for other purposes in data center 200 as well. Although shown in FIG. 8 as a stand-alone controller 202 for purposes of example, a computing device may be any component or system that includes one or more processors or other suitable computing environment for executing software instructions and, for example, need not necessarily include one or more elements shown in FIG. 8 (e.g., communication units 806; and in some examples components such as storage device(s) 808 may not be co-located or in the same chassis as other components).

As shown in the specific example of FIG. 8, controller 202 includes one or more processors 802, one or more input devices 804, one or more communication units 806, one or more output devices 812, one or more storage devices 808, and user interface (UI) device 810, and communication unit 806. Controller 202, in one example, further includes one or more applications 822, cooling unit control applications 824, and operating system 816 that are executable by controller 202. Each of components 802, 804, 806, 808, 810, and 812 are coupled operatively for inter-component communications. In some examples, communication channels 814 may include a system bus, a network connection, an inter-process communication data structure, or any other method for communicating data. Communication may be via one or more communication protocols including ModBus, BacNET, proprietary DDC or PLC manufacturer's protocol, PCI, or an open protocol. As one example, components 802, 804, 806, 808, 810 and 812 may be coupled by one or more communication channels 814. Controller 202 may be located and execute, for example, within data center 200 or at another location.

Processors 802, in one example, are configured to implement functionality and/or process instructions for execution within controller 202. For example, processors 802 may be capable of processing instructions stored in storage device 808. Examples of processors 802 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 808 may be configured to store information within controller 202 during operation. Storage device 808, in some examples, is described as a (non-transitory) computer-readable storage medium. In some examples, storage device 808 is a temporary memory, meaning that a primary purpose of storage device 808 is not long-term storage. Storage device 808, in some examples, includes volatile memory, meaning that storage device 808 does not maintain stored contents when the computer is turned off. Examples of volatile memories include random access memories (RAM), dynamic random access memories (DRAM), static random access memories (SRAM), and other forms of volatile memories known in the art. In some examples, storage device 808 is used to store program instructions for execution by processors 802. Storage device 808 in one example, is used by software or applications running on controller 202 to temporarily store information during program execution.

Storage devices 808, in some examples, also include one or more computer-readable storage media. Storage devices 808 may be configured to store larger amounts of information than volatile memory. Storage devices 808 may further be configured for long-term storage of information. In some examples, storage devices 808 include non-volatile storage elements. Examples of such non-volatile storage elements include magnetic hard discs, optical discs, floppy disks, Flash memories, or forms of electrically programmable memories (EPROM) or electrically erasable and programmable (EEPROM) memories.

Controller 202, in some examples, also includes one or more communication units 806. Controller 202, in one example, utilizes communication units 806 to communicate with external devices via one or more networks, such as one or more wired/wireless/mobile networks, network 602, etc. Communication units 806 may include a network interface card, such as an Ethernet card, an optical transceiver, a radio frequency transceiver, or any other type of device that can send and receive information. Other examples of such network interfaces may include 3G, 4G and WiFi radios. In some examples, controller 202 may use communication unit 806 to communicate with an external device, such as controller 202, sensor 234, server racks 208, or any component within or external data center 200, whereby any of one or more of above-mentioned communication protocols may be used as examples for external communications. In some examples, communication unit(s) 806 and input device(s) 804 may be operatively coupled to controller 202. For example, controller 202 may receive a communication from an analog input device indicating an amperage, voltage, or other signal at the input device. Depending on implementation, digital signaling techniques, analog signaling techniques, or any combination thereof, may be used by controller 202 for the purpose of allocating data center power capacity that would otherwise be unused or unsold, or is idle, in accordance with the disclosure.

Controller 202, in one example, also includes one or more user interface devices 810. User interface devices 810, in some examples, are configured to receive input from a user through tactile, audio, or video feedback. Examples of user interface devices(s) 810 include a presence-sensitive display, a mouse, a keyboard, a voice responsive system, video camera, microphone or any other type of device for detecting a command from a user. In some examples, a presence-sensitive display includes a touch-sensitive screen.

One or more output devices 812 may also be included in controller 202. Output device 812, in some examples, is configured to provide output to a user using tactile, audio, or video stimuli. Output device 812, in one example, includes a presence-sensitive display, a sound card, a video graphics adapter card, or any other type of device for converting a signal into an appropriate form understandable to humans or machines. Additional examples of output device 812 include a speaker, a cathode ray tube (CRT) monitor, a liquid crystal display (LCD), or any other type of device that can generate intelligible output to a user.

Controller 202 may include operating system 816. Operating system 816, in some examples, controls the operation of components of controller 202. For example, operating system 816, in one example, facilitates the communication of one or more applications 822 and rack level power control application 824 with processors 802, communication unit 806, storage device 808, input device 804, user interface devices 810, and output device 812.

Application 822 and rack level power control application 824 may also include program instructions and/or data that are executable by controller 202. Rack level power control application 824 may include instructions for causing a special-purpose computing device to perform one or more of the operations and actions described in the present disclosure with respect to controller 202.

As one example, rack level power control application 824 may include instructions that cause processor(s) 802 of controller 202, equivalently controller 202 itself, to acquire status information of at least one resource of a data center, estimate, based on the status information, whether load on a power supply will exceed a threshold value at a time subsequent a time of the estimating, and transmit a command signal to a server rack that is coupled to the power supply to configure equipment of the server rack to operate at a reduced power supply level that is reduced from a power supply level at the time of the estimate and that is based on a service level agreement associated with the server rack. Such actions may be implemented in response to an estimate (e.g., forecast, projection) that load on the power supply will exceed the threshold value at the time subsequent the time of the estimate, similar to that discussed above in connection with at least FIG. 3 where system 206d may serve as a repository for said service level agreements, and whereby the threshold value may correspond to a value for variable used capacity 118 which may fluctuate but for one or several machine cycles may be constant or assume a same or similar value within specification tolerance (e.g., +/− acceptable error).

As another example, rack level power control application 824 may include instructions that cause processor(s) 802 of controller 202, equivalently controller 202 itself, to signal a management system of the data center to acquire online/offline status of the at least one resource of the data center, and estimate, based on the online/offline status, whether load on the power supply will exceed the threshold value at the time subsequent the time of the estimate. Such actions may be similar to that discussed above in connection with at least FIG. 3, where system 206a may serve as a source for online/offline status of the at least one resource of the data center and signaling sequences between controller 202, operational status system 206, power supply system 204 and server racks 208 may be applicable in general.

As another example, rack level power control application 824 may include instructions that cause processor(s) 802 of controller 202, equivalently controller 202 itself, to signal a management system of the data center to acquire mechanical cooling efficiency status of the at least one resource of the data center; and estimate, based on the mechanical cooling efficiency status, whether load on the power supply will exceed the threshold value at the time subsequent the time of the estimate. Such actions may be similar to that discussed above in connection with at least FIG. 3, where system 206b may serve as a source for mechanical cooling efficiency status of the at least one resource of the data center and signaling sequences between controller 202, operational status system 206, power supply system 204 and server racks 208 may be applicable in general.

As another example, rack level power control application 824 may include instructions that cause processor(s) 802 of controller 202, equivalently controller 202 itself, to signal a management system of the data center to acquire status of at least one other server rack of the data center that is configured according to a different technical specification than the server rack, and estimate, based on the status of at least one other server rack, whether load on the power supply will exceed the threshold value at the time subsequent the time of the estimate. Such actions may be similar to that discussed above in connection with at least FIG. 3, where system 206c may serve as a source for status of at least one other server rack of the data center that is configured according to a different technical specification than the server rack (e.g., legacy devices not configured according to Open Compute specification, etc.) and signaling sequences between controller 202, operational status system 206, power supply system 204 and server racks 208 may be applicable in general.

As another example, rack level power control application 824 may include instructions that cause processor(s) 802 of controller 202, equivalently controller 202 itself, to signal a management system of the data center to acquire status of at least one other server rack of the data center that is configured according to a same technical specification as the server rack, and estimate, based on the status of at least one other server rack, whether load on the power supply will exceed the threshold value at the time subsequent the time of the estimate. Such actions may be similar to that discussed above in connection with at least FIG. 3, where system 206a may serve as a source for status of at least one other server rack of the data center that is configured according to a same technical specification than the server rack (e.g., both server racks are configured according to Open Compute specification, etc.) and signaling sequences between controller 202, operational status system 206, power supply system 204 and server racks 208 may be applicable in general.

As another example, rack level power control application 824 may include instructions that cause processor(s) 802 of controller 202, equivalently controller 202 itself, to periodically or intermittently estimate whether load on the power supply will exceed the threshold value at a subsequent time of the estimate, and signal the server rack to configure equipment of the server rack to operate at a power supply level that is different from a power supply level at the time of the estimate and that is based on the service level agreement associated with the server rack. Such actions may be similar to that discussed above in connection with at least FIG. 5, where the "+1" of the time T+1 may correspond to a programmable value, and signaling sequences between controller 202, operational status system 206, power supply system 204 and server racks 208 may be applicable in general.

As another example, rack level power control application 824 may include instructions that cause processor(s) 802 of controller 202, equivalently controller 202 itself, to evaluate the service level agreement that is associated with the server rack, wherein the service level agreement includes a first tier contract for power at a first level of availability and a second tier contract for power at a second level of availability that is different than the first level of availability, and calculate a magnitude of the power supply level based on the second level of availability that is different than the first level of availability. Such actions may be similar to that discussed above in connection with at least Table 1, where server rack 208a for example is associated with a first tier contract for 10 kW power at 99.999% availability as well as a second tier contract for 5 kW power at 95.0% availability, where the power supply level is reduced by a magnitude that is a function of both the first and second tier contract.

As another example, rack level power control application 824 may include instructions that cause processor(s) 802 of controller 202, equivalently controller 202 itself, to generate a command signal to control at least one of the plurality of server racks to self-configure equipment to operate at a power supply level that is reduced in magnitude from a power supply level at the time of a calculation. Such an action may be similar to that discussed above in connection with at least FIG. 1, where trace 106 temporarily exceeds variable usable capacity 118 and controller 202 responds to command at least one of server racks 208 to throttle back power usage or draw at least during time interval 511 shown in FIG. 1

As another example, rack level power control application 824 may include instructions that cause processor(s) 802 of controller 202, equivalently controller 202 itself, to generate a command signal to control at least one of the plurality of server racks to self-configure equipment to operate at a power supply level that is increased in magnitude from a power supply level at the time of a calculation. Such an action may be similar to that discussed above in connection with at least FIG. 1, where trace 106 temporarily exceeds variable usable capacity 118 and controller 202 responds to command at least one of server racks 208 to throttle back power usage or draw at least during time interval 511 shown in FIG. 1, while at the same controller 202 may respond to command at least one of server racks 208 to throttle up power usage in order to meet contact obligations.

As another example, rack level power control application 824 may include instructions that cause processor(s) 802 of controller 202, equivalently controller 202 itself, to evaluate the service level agreement for each one of the plurality of server racks, and control an order by which a command signal is transmitted to each one of the plurality of server racks based on a priority that is assigned to the service level agreement for each one of the plurality of server racks. Such actions may be similar to that discussed above in connection with at least Table 1, where controller 202 may command server racks 208a-c, N to throttle back power usage or draw based upon a priority level assigned to Tiers 1-3 of the example.

The techniques described throughout may be implemented by or as any one of a method, a device and a system according to the principles of the present disclosure. In addition, the techniques described throughout may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASIC s), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
by a controller,
acquiring status information of at least one resource of a data center, the data center including a server rack coupled to a power supply, wherein one or more service level agreements associated with the server rack include one or more contracts for power at respective power levels and respective levels of availability;

estimating, based on the status information, whether load on the power supply will exceed a threshold value at a time subsequent to a time of the estimating;
identifying, in response to the estimating and based at least on the one or more service level agreements associated with the server rack, the server rack for a reduction in load based on the one or more contracts for power; and
in response to identifying the server rack for the reduction in load, transmitting a command signal to the server rack to configure equipment of the server rack to operate at a reduced power supply level that is reduced from a power supply level at the time of the estimating and that is based on the one or more service level agreements associated with the server rack.

2. The method of claim 1, further comprising:
obtaining, from a management system of the data center, online/offline status of the at least one resource of the data center,
wherein the estimating further comprises estimating, based on the online/offline status, whether load on the power supply will exceed the threshold value at the time subsequent to the time of the estimating.

3. The method of claim 1, further comprising:
obtaining, from a management system of the data center, mechanical cooling efficiency status of the at least one resource of the data center,
wherein the estimating further comprises estimating, based on the mechanical cooling efficiency status, whether load on the power supply will exceed the threshold value at the time subsequent to the time of the estimating.

4. The method of claim 1, further comprising:
obtaining, from a management system of the data center, status of at least one other server rack of the data center that is configured according to a different technical specification than the server rack,
wherein the estimating further comprises estimating, based on the status of the at least one other server rack, whether load on the power supply will exceed the threshold value at the time subsequent to the time of the estimating.

5. The method of claim 1, further comprising:
obtaining, from a management system of the data center, status of at least one other server rack of the data center that is configured according to a same technical specification as the server rack,
wherein the estimating further comprises estimating, based on the status of at least one other server rack, whether load on the power supply will exceed the threshold value at the time subsequent to the time of the estimating.

6. The method of claim 1, wherein the estimating comprises periodically or intermittently estimating whether load on the power supply will exceed the threshold value at a time subsequent to the time of the estimating.

7. The method of claim 1, further comprising:
evaluating the one or more service level agreements that are associated with the server rack, wherein the one or more contracts for power include a first tier contract for power at a first level of availability and a second tier contract for power at a second level of availability that is different than the first level of availability; and
calculating a magnitude of the reduced power supply level based on the second level of availability.

8. The method of claim 1, further comprising:
evaluating the one or more service level agreements that are associated with the server rack and a service level agreement that is associated with at least one other server rack of the data center, wherein the one or more contracts for power include a first tier contract for power at a first level of availability and a second tier contract for power at a second level of availability that is different than the first level of availability, and wherein the service level agreement that is associated with the at least one other server rack includes a third tier contract for power at a third level of availability that is different than the first level of availability and the second level of availability; and
calculating a magnitude of the reduced power supply level based on the one or more service level agreements that are associated with the server rack and the service level agreement that is associated with the least one other server rack.

9. The method of claim 1, further comprising:
calculating a magnitude of the reduced power supply level by:
querying a structured database that is configured to store the one or more service level agreements that are associated with the server rack and a plurality of other service level agreements each associated with at least one of a plurality of other server racks of the data center, and
calculating a ratio of a first parameter that represents a reduction to running load to prevent load on the power supply from exceeding the threshold value and a second parameter that represents a number of server racks of the data center, selected from among the server rack and the plurality of other server racks, that are associated with a service level agreement having a lowest service level agreement priority to obtain the magnitude of the reduced power supply level, wherein the server rack is associated with a service level agreement associated with the lowest service level agreement priority.

10. The method of claim 1, wherein the server rack and at least one of a plurality of other server racks of the data center are associated with a service level agreement associated with a lowest service level agreement priority, and wherein the transmitting comprises:
transmitting the command signal to the server rack and to the at least one of the plurality of other server racks to configure equipment of the server rack and the at least one of the plurality of other server racks to operate at the reduced power supply level.

11. A controller comprising:
at least one processor coupled to a communication unit, wherein the at least one processor is configured to:
activate the communication unit to receive, from a system of the data center, status information of at least one resource of the data center, the data center including a server rack coupled to a power supply, wherein one or more service level agreements associated with the server rack include one or more contracts for power at respective power levels and respective levels of availability;
perform a calculation, based on the status information, to estimate load on the power supply at a time subsequent to a time of the calculation;
identify, based at least on the one or more service level agreements associated with the server rack, the server rack for a reduction or increase in load based on the one or more contracts for power; and activate the communication unit to transmit, to the server rack, a command signal to self-configure equipment to operate at a power supply level, at the time subsequent to the time of the calculation, that is based on the calculation and the one or more service level agreements associated with the server rack to realize the reduction or increase in load.

12. The controller of claim 11, wherein the power supply level subsequent to the time of the calculation is reduced in magnitude from a power supply level of the server rack at the time of the calculation.

13. The controller of claim 11, wherein the power supply level subsequent to the time of the calculation is increased in magnitude from a power supply level at the time of the calculation.

14. The controller of claim 11, wherein the at least one processor is configured to:

determine online/offline status of the at least one resource of the data center from the status information; and perform the calculation to estimate load on the power supply at the time subsequent to the time of the calculation based on the online/offline status of the at least one resource.

15. The controller of claim 11, wherein the at least one processor is configured to:

determine mechanical cooling efficiency status of the at least one resource of the data center based from the status information; and perform the calculation to estimate load on the power supply at the time subsequent to the time of the calculation based on the mechanical cooling efficiency status of the at least one resource.

16. The controller of claim 11, wherein the at least one processor is configured to:

determine status of at least one other server rack of the data center that is configured according to a different technical specification than each one of a plurality of other server racks based from the status information; and perform the calculation to estimate load on the power supply at the time subsequent to the time of the calculation based on the status of the at least one other server rack.

17. The controller of claim 11, wherein the at least one processor is configured to:

determine status of at least one other server rack of the data center that is configured according to a same technical specification as each one of a plurality of other server racks based from the status information; and perform the calculation to estimate load on the power supply at the time subsequent to the time of the calculation based on the status of the at least one other server rack.

18. The controller of claim 11, wherein the at least one processor is configured to:

evaluate one or more service level agreements for each one of a plurality of server racks including the server rack; and control an order by which command signals, including the command signal, are transmitted to each one of the plurality of server racks based on respective priorities that are assigned to the one or more service level agreements for each one of the plurality of server racks.

19. A system comprising:

a plurality of server racks in a data center each coupled to a power supply and configured according to a same technical specification, wherein each of the plurality of server racks is associated with one or more service level agreements that include one or more contracts for power at respective power levels and respective levels of availability; and a controller configured to:

acquire status information of at least one resource of the data center;

perform a calculation, based on the status information, to determine whether load on the power supply will exceed a threshold value at a time subsequent to a time of the calculation;

identify, in response to the calculation and based at least on the one or more service level agreements associated with each of the plurality of server racks, at least one server rack of the plurality of server racks for a reduction or increase in load based on the one or more contracts for power of the one or more service level agreements associated with each server rack of the at least one server rack; and transmit, in response to the identification of the at least one server rack, a command signal to each server rack of the at least one server rack to self-configure equipment to operate at a power supply level that is different from a power supply level at the time of the calculation and that is based on the one or more service level agreements associated with each server rack of the at least one server rack.

20. The system of claim 19, wherein the controller is further configured to:

signal a management system of the data center to acquire online/offline status and mechanical cooling efficiency status of the at least one resource of the data center; and perform the calculation to determine, based on at least one of the online/offline status and the mechanical cooling efficiency status, whether load on the power supply will exceed the threshold value at the time subsequent to a time of the calculation.

21. The system of claim 19, wherein the controller is further configured to:

evaluate the one or more service level agreements for each one of the plurality of server racks; and control an order by which the command signal is transmitted to each server rack of the at least one server rack based on a priority that is assigned to and by a level that is a function of the one or more service level agreements for each server rack of the at least one server rack so that power availability as defined by the one or more service level agreements for each server rack of the at least one server rack is met over a particular time interval.

22. The system of claim 19, wherein each one of the plurality of server racks is configured according to a same technical specification that supports equipment to self-configure equipment to operate at power supply level that is different from the power supply level at the time of the calculation.

23. The system of claim 19, wherein each one of the plurality of server racks includes at least one power distribution unit and at least one bank of batteries to supply power to equipment incorporated thereon.

* * * * *